(12) United States Patent
Schröder et al.

(10) Patent No.: US 10,609,793 B2
(45) Date of Patent: *Mar. 31, 2020

(54) NETWORK OF LIGHTS AND OPERATING METHOD THEREOF

(71) Applicant: SCHREDER, Brussels (BE)

(72) Inventors: Helmut Schröder, Wiesbaden (DE); Daniel Brand, Köln (DE); Didier Wellens, Kraainem (BE)

(73) Assignee: SCHREDER, Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 16/509,787

(22) Filed: Jul. 12, 2019

(65) Prior Publication Data

US 2019/0335569 A1 Oct. 31, 2019

Related U.S. Application Data

(63) Continuation of application No. 15/525,255, filed as application No. PCT/EP2015/076219 on Nov. 10, 2015, now Pat. No. 10,375,801.

(30) Foreign Application Priority Data

Nov. 10, 2014 (EP) .................................. 14192582

(51) Int. Cl.
*H05B 37/02* (2006.01)
*H04B 10/11* (2013.01)

(52) U.S. Cl.
CPC ......... *H05B 37/0272* (2013.01); *H04B 10/11* (2013.01); *H05B 37/0245* (2013.01); *Y02B 20/72* (2013.01)

(58) Field of Classification Search
CPC . H05B 37/0272; H05B 37/0245; Y02B 20/72
See application file for complete search history.

(56) References Cited

U.S. PATENT DOCUMENTS

| | | |
|---|---|---|
| 2010/0123570 A1 | 5/2010 | Antonopoulos et al. |
| 2010/0201267 A1 | 8/2010 | Bourquin et al. |

(Continued)

FOREIGN PATENT DOCUMENTS

| | | |
|---|---|---|
| EP | 2262350 A1 | 12/2010 |
| JP | 2014107230 A | 6/2014 |

(Continued)

*Primary Examiner* — Thuy V Tran
(74) *Attorney, Agent, or Firm* — Browdy and Neimark, P.L.L.C.

(57) ABSTRACT

Described herein is method for operating and controlling a network of lights comprising a plurality of lights arranged in a number of groups (A, B) using a short-distance network. Each light includes a control module (23, 28) for controlling its normal operation and for short-distance communication over the short-distance network with a designated group controller (23', 28', 31, 32) and other control modules within the group. Each designated group controller (23', 28', 31, 32) is also operable for long-distance communication with a central server and transmits its own specific information as a control module as well as information received from other control modules within the group. Information relevant to more than one group can quickly be exchanged between adjacent groups over a long-distance network via the group controller of the adjacent groups, by-passing the central server, or directly over the short-distance connection to a control module of an adjacent group. Failure of a group controller (23', 28', 31, 32) can be managed by designating another control module (23, 28) within the group as a new group controller and the flexible short-distance network is re-formed around the new group controller.

20 Claims, 4 Drawing Sheets

(56) References Cited

U.S. PATENT DOCUMENTS

| | | | |
|---|---|---|---|
| 2012/0306378 A1* | 12/2012 | Oh | H05B 37/0272 |
| | | | 315/151 |
| 2013/0057158 A1 | 3/2013 | Josefowicz et al. | |
| 2013/0297212 A1* | 11/2013 | Ramer | G08B 5/36 |
| | | | 702/1 |
| 2014/0001963 A1 | 1/2014 | Chobot et al. | |
| 2014/0084795 A1* | 3/2014 | Cumpston | H05B 37/0272 |
| | | | 315/149 |
| 2016/0286627 A1* | 9/2016 | Chen | H05B 37/0245 |
| 2016/0286629 A1 | 9/2016 | Chen | |

FOREIGN PATENT DOCUMENTS

| | | |
|---|---|---|
| WO | 2014/138380 A1 | 9/2014 |
| WO | 2014147510 A1 | 9/2014 |

* cited by examiner

NETWORK OF LIGHTS AND OPERATING METHOD THEREOF

BACKGROUND OF THE INVENTION

The present invention relates to a method for operating and particularly for controlling a network of lights, in which case the lights are in particular street lights.

The state of the art shows that networks of lights are equipped with increasingly intelligent control systems. For instance, networks of lights can be operated by telemanagement systems, in which a device known as segment controller, which is connected to a management console on a PC, controls a number of lights via their control module. The segment controller, which is too large to be integrated into a light, must be set up such that the lights to be controlled can communicate with the controller via a short-distance communication module. A failure of the segment controller leads to a control failure of the light network. Finally, the latency in the network is comparatively high due to the large number of lights controllable by a segment controller, so that high-priority events cannot be transmitted to potential further groups in time due to the high latency.

SUMMARY OF THE INVENTION

The invention described herein aims to create a method for operating a network of lights, which is not only easier to start up, but also guarantees improved communication stability as well as faster communication The task is solved by a method described in the independent method claim as well as an object described in the independent apparatus claim. Advantageous embodiments of the invention are described in the sub-claims referring to the above-mentioned claims as well as the following description.

The method according to this invention can be used to facilitate installation of a network. At the same time, improved communication stability and faster communication is guaranteed. The method for operating and in particular controlling a network, particularly of street lights, according to this invention makes use of multiple control modules, each of which is allocated or is to be allocated to one light and each of which is equipped with a long-distance communication module (e.g. GSM, GPRS, Iridium or another cellular network or an Ethernet connection), a short-distance communication module (ZigBee, 6 LoWPAN or similar), preferably a near field communication module, a geocoordinate module to determine the position of the control module based on GPS, GLONASS Galileo, BeiDou or other in particular satellite based positioning systems, a controller and additionally a control output (e.g. on a DALI or 0 resp. 1 to 10 volt basis). At least one of the control modules comprises a sensor (e.g. a radar or an infrared sensor), that can produce sensor information, respectively sensor data being relevant to more than one group. The control output can transmit control signals to a driver of an illuminant of the light, preferably, a street light. Furthermore, the network is equipped with at least one server to be reached via the long-distance communication module. A suitable software for telemanagement can run on this server. The long-distance communication module can be based on different network techniques. For example these could be a cellular network, an IP-network or a long range peer-to-peer network.

For installing and/or operating the network, the control modules are divided into several groups of control modules, with this division being based on information provided by the control modules concerning the environment, lights and/or control modules. Particularly, at most, 200, preferably no more than 50, control modules are allocated to one group. The division of the control modules into one or more groups of control modules is preferably performed by the server.

As environmental information, in addition to geocoordinates, information regarding adjacent control modules in the short-distance network (e.g. connection quality and/or other RF characteristics and/or neighbourhood tables) and/or environment-specific information (e.g. light intensity in the surroundings) may be taken into consideration. The information concerning the lights may be information regarding the illuminants used, their drives and/or further details of the allocated light, e.g. the current light intensity or dimming. The control module information is particularly information used for clear identification of the control module, such as its IP address or another UID (Unique IDentifier).

According to this invention, the server selects one control module per group as group controller. The other control modules of the corresponding group use their short-distance communication modules to communicate with this controller. This means communication within a group uses the corresponding short-distance communication modules. Within the group, the control modules of the group form a short-distance network via their corresponding short-distance communication modules, preferably a mesh network.

During normal operation of the network, the group controller can only transmit its own environmental, light and/or control module (specific) information and the corresponding information received from its other control modules to the server via the long-distance communication module. For this purpose, normal operation is understood as the usual operation of the network, in which each control module of the network is allocated to a group and in which all control modules carry out their actual task, controlling the light. For both, the methods described above and below, transmission of information is always executed through transmission of the corresponding data on the basis of specific communication protocols.

According to this invention, information relevant to more than one group can be exchanged between adjacent groups quickly. Information relevant to more than one group is, in particular, sensor information or data based on sensor information, for instance regarding the lighting situation for driving cars or pedestrians. The increased communication speed in comparison with the state of the art is based on the respective information either being transmitted directly via the long-distance network to a group controller of an adjacent group, by-passing the server, or directly via the short-distance network to a control module of an adjacent group.

In particular, this information can be transmitted directly from the control module equipped with the sensor which created the information. For protocol purposes the server can be informed of the respective information.

The data relevant for multiple groups based on sensor information can be transmitted directly via the short-distance network to a control module of an adjacent group, by-passing the server, if a different frequency band is used than the one used during normal operation within one group. This means the short-distance communication module should preferably be multiplex-capable.

To prevent false alarms or optimise the lighting situation, transmission of sensor information based on an event can be subject to the spatial and/or temporal occurrence of the event. For instance, if only one vehicle approaches a crossing, no information can be transmitted, whereas if two or more vehicles' approach is signalled by different sensors to the same group controller, this information can be transmitted to an adjacent group and the brightness of lights in different groups can be increased.

It is beneficial for the server, if the corresponding software can make a group-independent selection of control modules for the exchange of data relevant for multiple groups. This can be supported graphically, for instance if those control modules which are to exchange sensor information are marked on an overview map. This makes it possible for large crossroads on the border of adjacent groups equipped with control modules belonging to different groups to be marked, to quickly increase the lighting volume in the driving direction of an approaching car. Of course, this selection and the corresponding communication partners will be provided to the affected members of the respective groups in an exemplary list.

Due to the redundant set-up of the respective control modules within a group, a new group controller can easily be determined by the server in case of a group controller failure. Once the new group controller has been announced within a group, i.e. on the level of the short-distance communication network (PAN=Personal Area Network), the other control modules not defined as group controllers establish their connections via the group controller. This means that the server can continue to control and monitor the system. At the same time, the single active control module (group controller) per group makes expenses significantly lower than in a network where all control modules communicate separately with the server via their respective long-distance module. The set-up of the internal group network as mesh network makes the system and communication on the PAN level more fail-safe.

If "with" is used above or below to explain process steps, this does not necessarily mean that the connected process steps are simultaneous. Rather, these process steps may (but do not have to) be simultaneous.

A server in this case is not necessarily a separate data processing system with separate hardware. It can also merely be a project-specific separation within a telemanagement program. It may also be a virtual server on the same hardware or within a cloud.

To set up a mesh network, it can be advantageous for the respective group controller to receive data about the members of its group from the server and for the group controller to determine itself as group controller in relation to the other group members. As an alternative or in addition, the other group members may receive data about the communication path or the desired group controller to ensure that communication with the server and between multiple groups remains problem-free.

Accordingly, the information provided by the server can be information for the control modules, which informs these about adjacent control modules of the same group. The server may, for instance, extract this data by observing the geocoordinates of the respective control modules.

To signal successful commissioning/start-up, for instance successful integration of a control module into the group network or successfully established contact with a server, to the operating personnel when a new light or a new control module is installed and/or after maintenance work on the respective light, the control module can operate the light at different brightness levels over predetermined or determinable time intervals once the desired state has been reached.

Preferably at least one of the control modules receives not only information regarding data transmission between groups, but also a parameter set for operation of the light from the server after its initial installation and/or re-installation. This set may, for instance, consist of dimming curves.

To facilitate the fastest possible start-up of the network without delays, the control modules can scan the short-distance network for other control modules automatically after they are first started up, thereby creating an internal table of adjacent modules which contains the closest adjacent modules in the short-distance network. This list can later be transmitted to the server. In particular, this adjacent module information can be transmitted to the server together with other light-specific or control module-specific information after the mesh network is set up and a group controller has been allocated.

An ideal, i.e. fast communication within a group is achieved particularly if, depending on the number of new control modules, a request of a group is carried out at a pre-determined time and/or due to a initialisation by the server via the short-distance network based environment of the control modules. For this purpose it may be helpful to limit communication within the mesh network via the group controller to the server for a short time and only allow observation and communication with the closest adjacent modules in the mesh network based on the short-distance module and the respective protocol. This serves to create neighbourhood module tables or lists, with information about the signal strength and/or quality of the connection to the respective adjacent modules being registered at the same time. This information can be cached and/or stored and then transmitted via the group controller or, if all long-distance communication modules of the control modules are active, transmitted directly to the server.

To enable the server to select a suitable group controller and create an ideal group, it may be beneficial to have the respective control modules register and save data concerning their UID in the short-distance network, their IP address in the long-distance network, their UID in the near field network, light-specific information, data of a number of neighbours in the short-distance network, particularly of up to 50, preferably of up to 10 adjacent control modules in the short-distance network including their UIDs and/or the connection quality of the adjacent control modules during a scan process and then have this information (data) transmitted via the group controller to the server at a given time. If the control module is active, i.e. equipped with an active long-distance network access, the server may receive this information directly from the control module.

The commissioning of the network and the division into groups and/or allocation of the group controller on the server should then preferably be carried out automatically. As an alternative or in addition, the division into groups and/or allocation of the group controller may be varied by user input. For instance, this is beneficial if a program running on the server causes an ambiguous selection of a group controller.

To keep the latency in the network under a desired level, a maximum definable number of control modules being set on the server should preferably be allocated to each group, with 200 control modules potentially being the upper limit. Tests and simulations with up to 2000 lights have shown that the latency in larger network groups becomes too large to guarantee proper operation and regular inspection of the network status.

Preferably the number of control modules should be less than 150 per group, particularly less than 50 control modules.

In particular, the selection of the group controller and/or allocation of the control modules to their respective group can take into account at least some of the rules for:
- the ratio of active to inactive control modules,
- the availability of adjacent control modules in the short-distance network,
- the number of network malfunctions.
- the network changes (new control modules in relation to deleted control modules),
- the changes of connection quality in the short-distance network,
- the estimated cost of connection to the long-distance network provider,
- the communication of sensor data between adjacent groups,
- the latency within a group (including distance-dependent delay),
- fall-back options (replacement of failed group controllers) and/or
- a stabilisation component to take into account a time-controlled damping.

Preferably the rules are mapped and linked by an AI system. A simple implementation of these rules can make use of logic operations, e.g. AND/OR/NOR links.

Furthermore, the fail safety is increased if at least one replacement group controller is defined by the server according to the control strategies, which switches from a suspended to an active state if the actual group controller fails.

To make detection of environment information by the short-distance network and communication in the short-distance network for purposes of the normal operation (communication with the server) more problem-free, it may be beneficial for the corresponding communication in the short-distance network to take place on different frequency bands of said network. Preferably the same antennae can be used for this (multiplex operation).

A network according to this invention designed as described above and below also has the corresponding advantages.

DESCRIPTION OF THE DRAWINGS

For further advantages and detailed features of the invention, refer to the following figure descriptions. The schematic figures show.

DETAILED DESCRIPTION

Individual technical features of the design examples described below can also be combined with design examples described above as well as the features of independent claims and potential further claims to form objects according to this invention. If it makes sense, functionally equivalent elements are given the same reference number.

The present invention comprises a network comprising a 20 plurality of luminaires, each luminaire having a controller or control module for controlling the operation thereof, and a server. Each controller is connected over an GSM Modem or a low power radio network (LPRN) and decides how best they can communicate to the server. In a preferred embodiment, the controllers are able to form small networks with a group controller, the group controller having an active GSM modem which is shared within the small network and through which communication is made with the server over a provider GSM network.

As each controller communicates with the group controller, there is no need for more than one active GSM modem to be present in each small network with the advantage that costs can be reduced (GSM network costs). Each controller uses the LPRN to communication to its group controller using 6LoWAN using an IPv6 protocol. As a result, each small network comprises an internet protocol version 6 (IPv6) network and communication within the network is only using IPv6 protocols.

The server also operates using IPv6 protocols. However, to transmit information from each group controller to the server, a GSM network is needed and currently, these operate using internet protocol version 4 (IPv4) protocols. This means that communication between the group controller and the server needs to be converted from IPv6 to IPv4 for transmission over the GSM network and then converted back again at the server. In addition, the communication over the GSM network is encrypted and secure, the encryption being provided in accordance with a suitable encryption protocol.

The server can decipher the encrypted communications received from group controllers over the GSM network and can also encrypt communications for transmission to the group controllers over the GSM network. This provides an end-to-end encrypted communication between the group controllers and the server.

Figure 1:
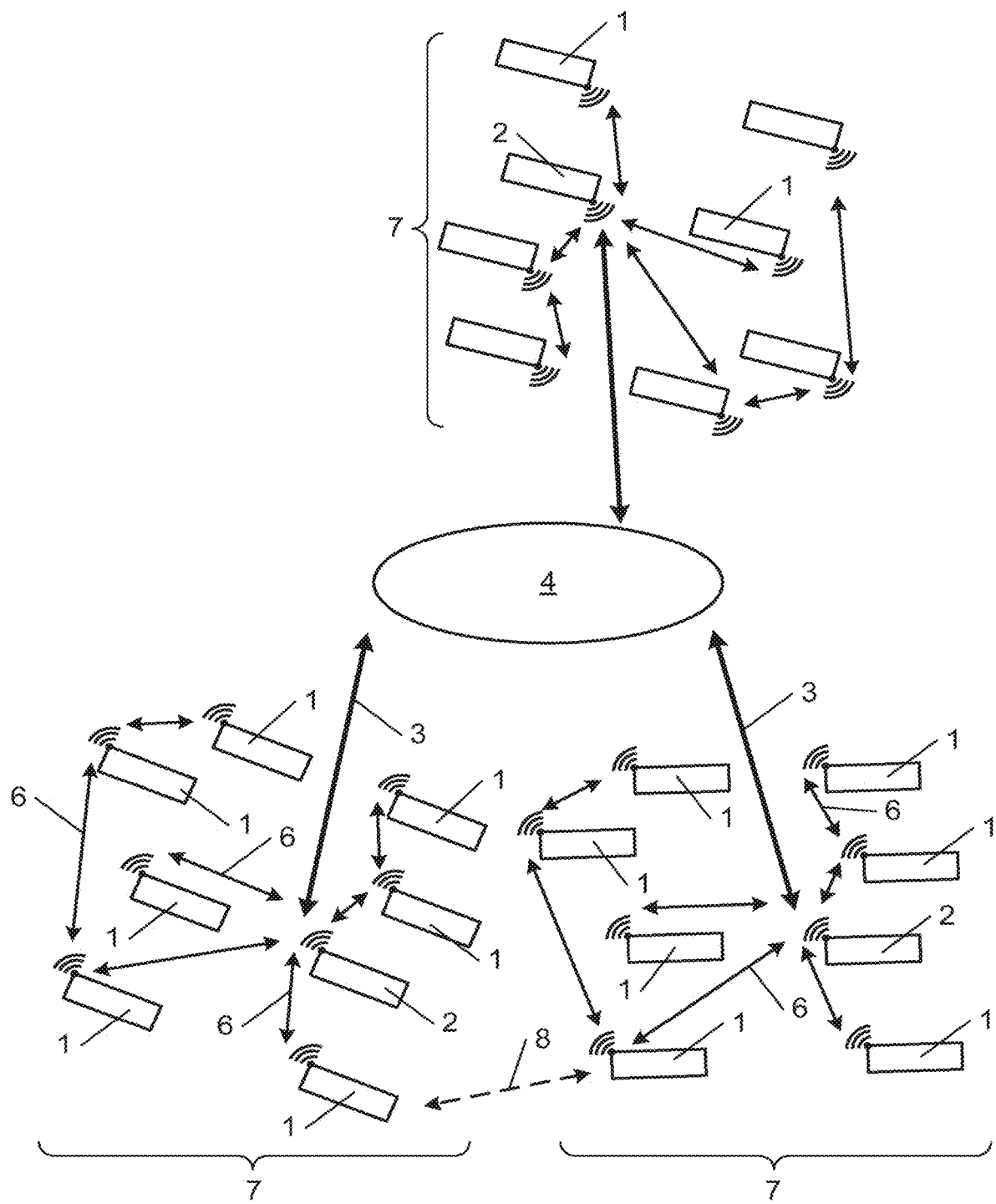
FIG. 1: a network according to this invention.

According to the method of this invention, FIG. 1 shows a multitude of control modules 1 being allocated to a group controller 2. The hardware of group controller 2 is identical to control modules 1. However, only the respective group controller 2 can use long-distance connection 3 to communicate with a server 4. Typically this is access to a local cellular network provider, through which the server can then remain accessible based on IP-WAN. Communication between the servers and group controllers can, for instance, be carried out via a common internet protocol (TCP/IP). As described above, this communication is using IPv6 protocol, and communication between the server and the group controllers involves tunnelling between IPv6 and IPv4 for transmission onto the GSM network, a communication using IPv4 over the GSM network, and a tunnelling between IPv4 and IPv6 at the server.

It will readily be understood that the requirement for the conversion/tunnelling between IPv6 and IPv4 and back again is due to the GSM network operating at IPv4. However, in the future, once the GSM network operates at IPv6, there will be no need for this conversion/tunnelling.

It will also be appreciated that in other embodiments of the present invention, the group controller and the server may operate on the same version of IP protocol as the GSM network.

Within a group 7, the control modules communicate with each other via short-distance connections 6. Preferably this communication should be based on a mesh network on the IEEE 802.15.4 standard, for example ZigBee.

The individual groups 7 of control modules 1, 2 can generally not see each other and therefore cannot interfere with each other. However, for communication of several groups it may be intended for control modules with adjacent locations to use short-distance connection 8 to share/exchange or forward sensor data or corresponding information between groups. This can then be used to initiate actions such as an increase of the light volume. As an alternative, this communication may also use the corresponding group controllers 2, which can see each other through their IP addresses in the inter- or intranet. The information regarding which control module may communicate with which other control module and how this module can communicate is defined on the server and carried out, for instance in case of short-distance communication between groups, in particular by means of a multiplex unit of each control module.

Figure 2:
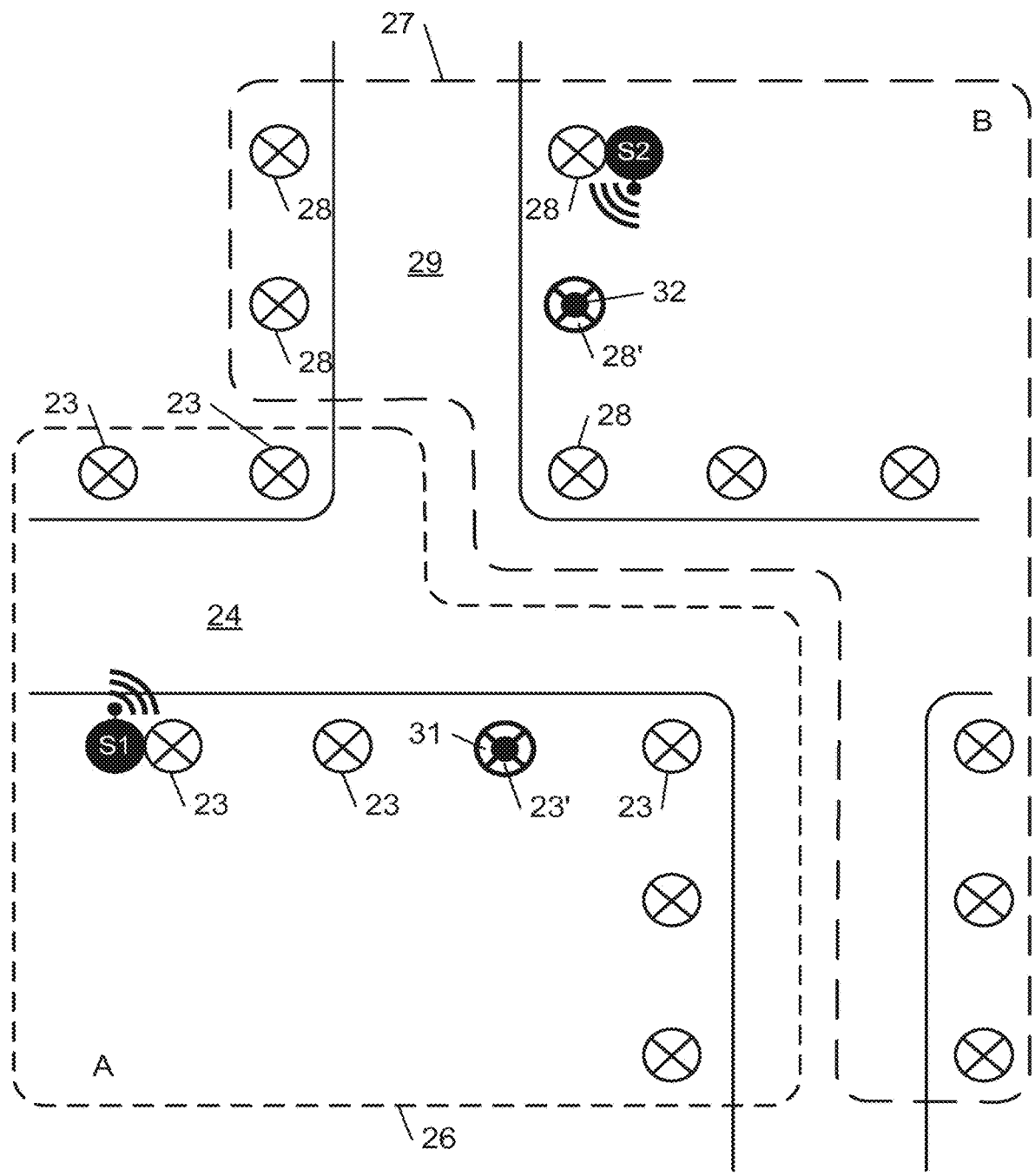
FIG. 2: another network according to this invention.

According to another design example of the invention according to FIG. 2, a number of lights with their respective control modules 23 and 23' are arranged along a street 24. These lights belong to a group of lights or control modules A, which was pre-determined on the server. Both group A and group B are marked by the broken lines 26 or 27. Group B contains lights with their corresponding control modules 28 or 28' which are placed alongside an intersecting street 29 leading into street 24. The inner black circles 31 and 32 mark a light with an active control module, a group controller. Sensors S1 and S2 are allocated to control module 23 and 28 respectively. As sensors, above all, radar sensors, infrared sensors (particularly passive infrared sensors) or induction loops in street 24 or 29 may be considered. These detect an approaching object, leading to the control modules both within a group and between groups adapting the light of the respective street light of the group to the situation.

For instance, sensor S1 of the control module of street light 23 detects an approaching object, e.g. a car, the light intensity of group A is increased by control modules 23 and 23' and this information or the information about the approaching car is transmitted via group controller 23' to the group controller 28' of group B. Subsequently, the brightness of the relevant lights 28 or 28', i.e. those selected by the server, is adjusted as well. As an alternative, the control module 23 equipped with sensor S1 can communicate directly with the group controller 28' of group B or another control module 28 of a street light allocated to this group controller, which means that this information is shared in the network and group B reacts accordingly.

Allocation of the respective control modules and therefore the corresponding street lights of a first group, which are to be provided with sensor information of an adjacent group's sensor and through which the information is then transmitted between groups, can be carried out on the server. Input masks are available for this purpose, particularly on the server.

Figure 3:
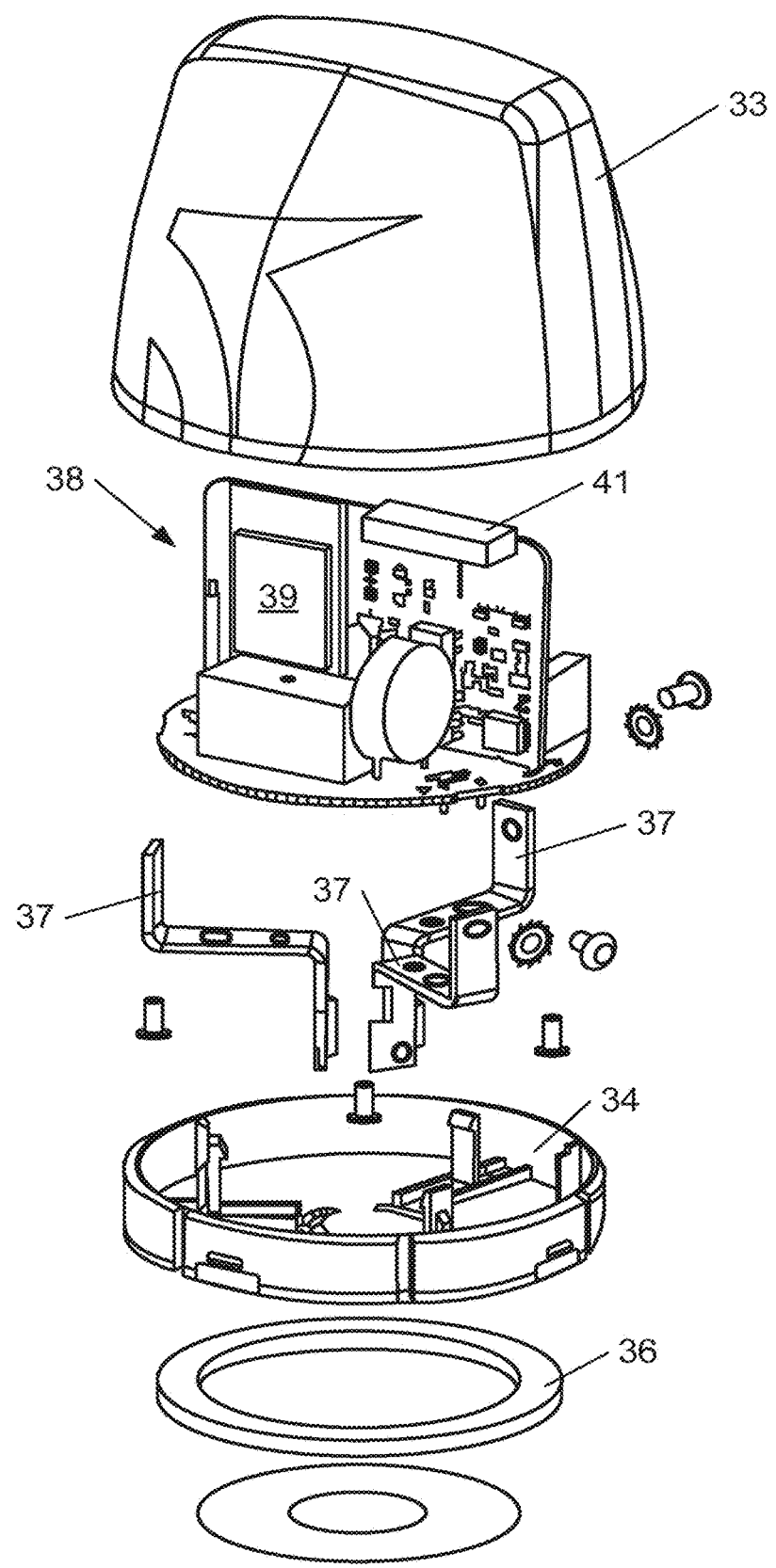
FIG. 3: a component of an object according to this invention, according to FIG. 2, and
FIG. 4: a component of an object according to this invention, according to FIG. 2.
Figure 4:
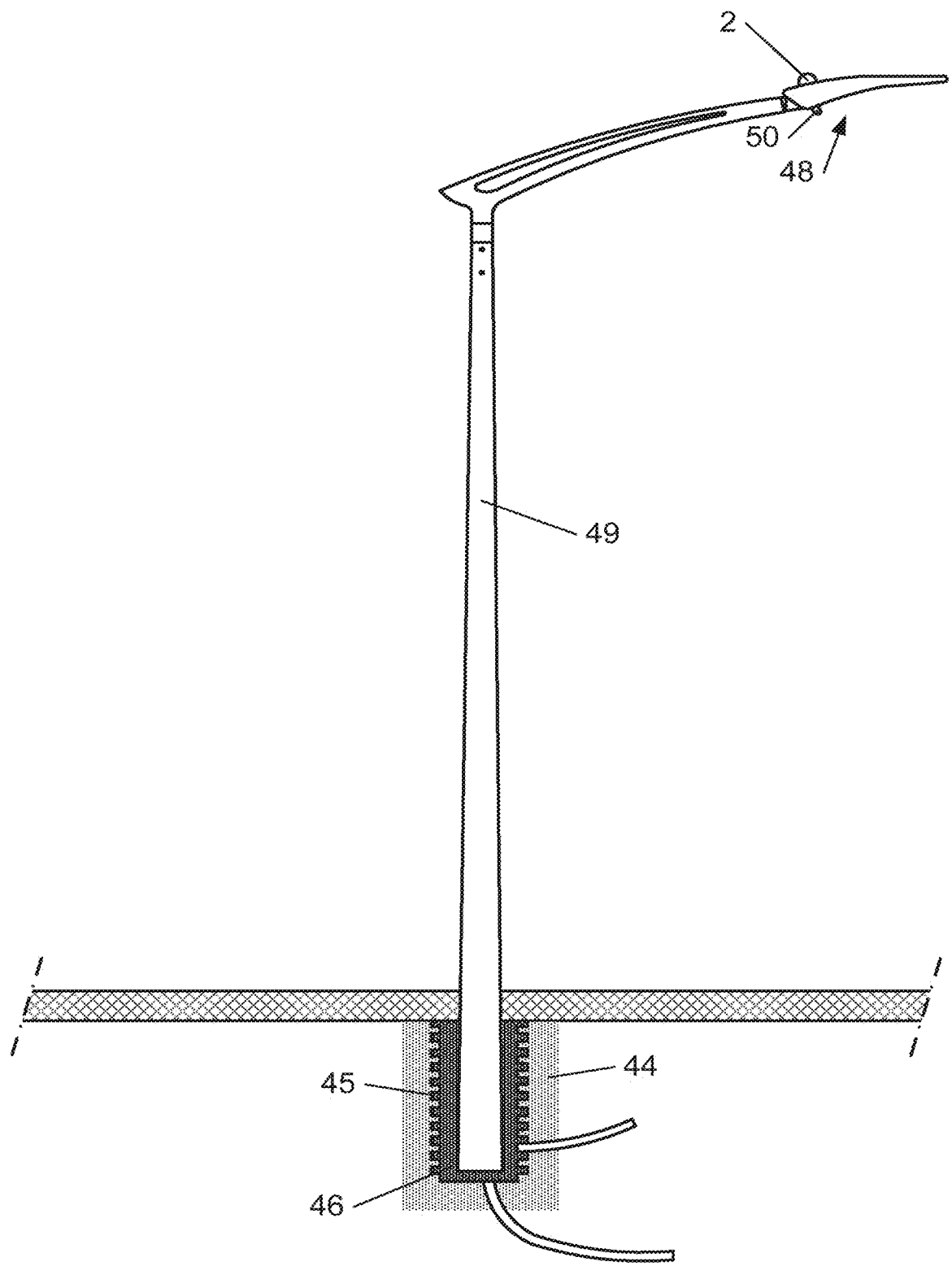

A control module according to this invention, which can be used to implement the method described above, is preferably designed as a separate unit, which can be installed on a light head, for instance of a street light (cf. FIG. 4). For further details regarding some of the crucial components of an externally installed control module, see FIG. 3. The exploded view comprises the control module, a top housing part 33 and a bottom housing part 34. The bottom housing part is to be fastened to a base fitted on top of the light by means of seal 36. The part is connected with the base through bayonet-type twisting contacts 37. These contacts 37 are fastened in housing 34 and also the location of the central circuit board unit 38. Among other things, a controller 39, short- and long-distance communication modules and an acceleration sensor unit 41 for detecting in particular seismic waves are located on this circuit board unit.

This figure does not show an RFID reader, which can be installed in a base on the light housing side in order to register light-specific data of an RFID transponder in the near field, nor does it show an infrared sensor 50 connected by cable 40.

A street light of the network according to this invention shown in FIG. 1 or 2 can be fastened to the ground by means of lean concrete 44, a foundation pipe 45 or dense filling material 46 as shown in FIG. 4. Acceleration sensors potentially installed in or on light head 48 in the control module can easily register seismic waves propagating in the ground or along the surface via mast 49. Potentially approaching vehicles can be identified by means of a passive infrared sensor 50 connected to control module 2 which is designated as the group controller in this case. In addition, further sensors such as brightness or temperature sensors can be installed on light head 48.

The invention claimed is:

1. A method of communication within a network of lights, the method including the steps of:
    providing a network of lights comprising a plurality of lights, each light having a control module associated therewith, each control module comprising:
        a long-distance communication module,
        a short-distance communication module,
        a geocoordinate module,
        a controller, each control module being configured for providing a control output for controlling a driver of the light,
    providing at least one server reachable via the long-distance communication module,
    dividing the control modules into several groups of control modules,
    selecting one of the control modules of each group as a group controller, with which all other control modules of the group communicate via their short-distance communication modules,
    forming a short-distance network with the control modules within the group via their corresponding short-distance communication modules,
    transmitting, during normal operation of the network, from the group controller to the server, at least one of its own environmental, light and control module specific information, and the corresponding information received from the other control modules via the short-distance communication module, and
    transmitting data in at least one of the following ways:
        from a first group controller to a second group controller, via their respective long-distance communication modules, by-passing the server with subsequent transmission of the data from the second group controller to a control module of the group associated with the second group controller,
        from a group controller to a control module of an adjacent group, via their respective short-distance communication modules, and
        from a control module of a group to a control module of an adjacent group, via their respective short-distance communication modules.

2. The method according to claim 1, wherein the transmission of data via the short-distance network takes place on a different frequency band than normal operation within a group.

3. The method according to claim 1, wherein at least one of the control modules comprises at least one sensor.

4. The method according to claim 3, wherein the at least one sensor produces sensor information, and wherein the transmitted data is based on sensor information and is of relevance for multiple groups.

5. The method according to claim 4, wherein, when the sensor information is related to an event, the transmission of data is carried out subject to at least one of: the spatial and temporal occurrence of the event.

6. The method according to claim 3, wherein the at least one sensor is at least one of: a radar, a brightness sensor, a temperature sensor, an infrared sensor, a movement sensor, a sound sensor and a vibration sensor.

7. The method according to claim 1, wherein each control module comprises a near-field communication module.

8. The method according to claim 1, wherein the short-distance network is a mesh network.

9. The method according to claim 1, further comprising the step of selecting, with the server, the control modules for exchanging data, irrespective of the group.

10. The method according to claim 1, wherein different frequency bands of the short-distance network are used for communication within a group during normal operation and for transmitting data to a control module of an adjacent group.

11. The method according to claim 10, wherein a same antenna is used for the different frequency bands.

12. A network of lights comprising:
a plurality of lights, each light having a control module associated therewith, each control module being configured for providing a control output for controlling a driver of an associated light and comprising:
a long-distance communication module,
a short-distance communication module,
a geocoordinate module, and
a controller,
at least one server reachable via the long-distance communication module of each control module,
the network of lights being configured for communication therewithin by:
dividing the control modules into several groups of control modules,
selecting one of the control modules of each group as a group controller, with which all other control modules of the group communicate via their short-distance communication modules,
forming a short-distance network with the control modules within the group via their corresponding short-distance communication modules,
transmitting, during normal operation of the network, from the group controller to the server, at least one of its own environmental, light and control module specific information, and the corresponding information received from the other control modules via the short-distance communication module, and
transmitting data in at least one of the following ways:
from a first group controller to a second group controller, via their respective long-distance communication modules, by-passing the server with subsequent transmission of the data from the second group controller to a control module of the group associated with the second group controller,
from a group controller to a control module of an adjacent group, via their respective short-distance communication modules, and
from a control module of a group to a control module of an adjacent group, via their respective short-distance communication modules.

13. The network of lights according to claim 12, wherein at least one of the control modules comprises at least one sensor.

14. The network of lights according to claim 13, wherein the at least one sensor produces sensor information, and wherein the transmitted data is based on sensor information and is of relevance for multiple groups.

15. The network of lights according to claim 14, wherein the transmission of data based on sensor information of relevance for multiple groups via the short-distance network takes place on a different frequency band than normal operation within a group.

16. The network of lights according to claim 14, wherein, when the sensor information is related to an event, transmission of data based on sensor information of relevance for multiple groups is carried out subject to at least one of: the spatial and temporal occurrence of the event.

17. The network of lights according to claim 13, wherein the at least one sensor is at least one of: an infrared sensor, a movement sensor, a sound sensor and a vibration sensor.

18. The network of lights according to claim 12, further configured for selecting, with the server, the control modules for exchanging data relevant to multiple groups, irrespective of the group.

19. The network of lights according to claim 12, wherein different frequency bands of the short-distance network are used for communication within a group during normal operation and for transmitting data to a control module of an adjacent group.

20. The network of lights according to claim 19, wherein a same antenna is used for the different frequency bands.

* * * * *